United States Patent Office 3,314,111
Patented Apr. 18, 1967

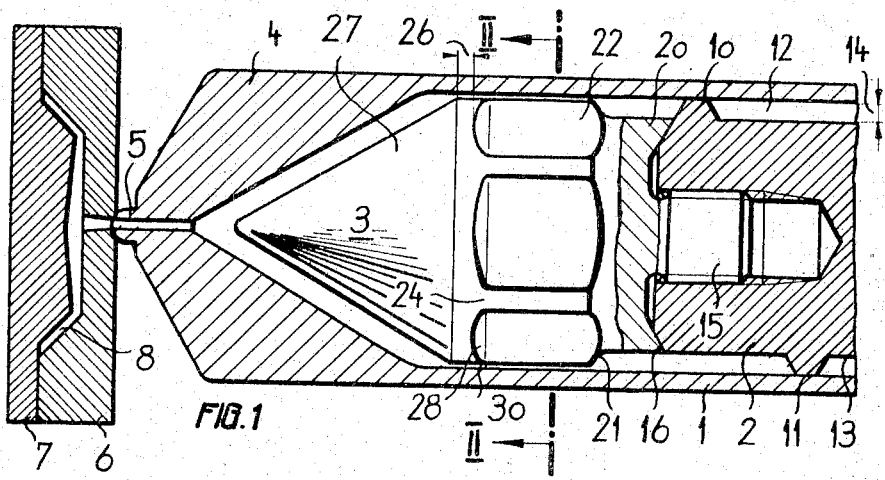
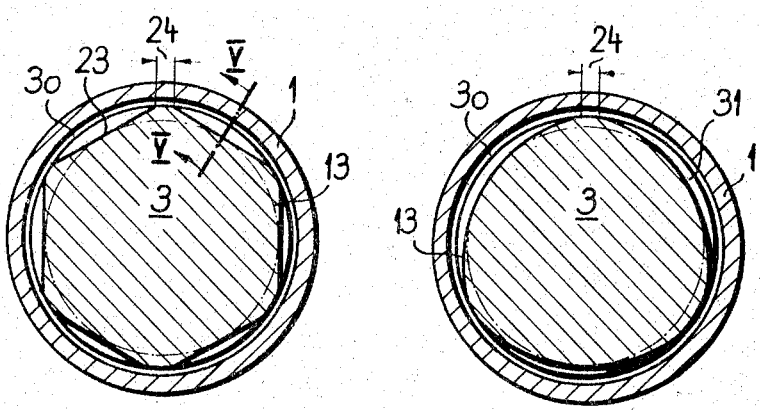
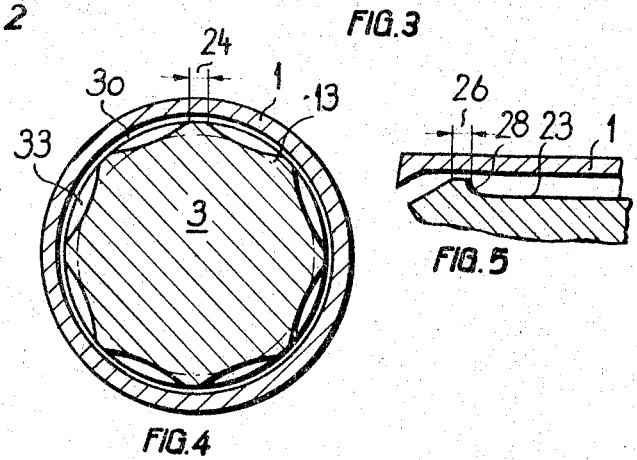

3,314,111
SCREW DIE CASTING MACHINES
Walter Tanner, Rubigen, and Viktor Zähner, Saint Gall, Switzerland, assignors to Gebruder Buhler, Oberuzwil, Switzerland, a company of Switzerland
Filed Feb. 12, 1964, Ser. No. 344,354
Claims priority, application Switzerland, Feb. 15, 1963, 1,943/63
14 Claims. (Cl. 18—30)

This invention relates in general to screw-die casting machines, and in particular to a new and useful rotatable screw for such machines having a removable head or end piece shaped to define prescribed flow areas in accordance with the material being used for casting.

The present invention is applicable to a casting machine of a type which includes a rotatable screw which is also displaceable longitudinally or axially in its surrounding cylinder. The cylinder includes means, such as a hopper, for supplying material, such as granular resin material, to be cast thereto which is advanced by rotation of the screw in a direction toward the head or end piece for discharge through an opening for injection into a mold.

For the purpose of producing shapes and structures in general by die casting from thermo-plastic substances such as, for example, polyethylene, polystyrene, cellulose-acetate and the like, screw-die casting machines are employed which are fitted with plastifying screws. In order to obtain an optimum effect, such die casting machines have screws of predetermined length and thread depths and the screws are operated at a predetermined speed. However, there are other plastics which have melting points in the neighborhood of the operating temperature, that is, the melting point is only a few degrees below the operating temperature. In addition, such thermo-plastic substances are also, in some instances, thermically sensitive. An example of some substances of this nature which can only be processed with difficulty, are, for example, the acetal resins. When materials of this nature are handled with ordinary die casting machines having ordinary screws, then a non-homogenous melt is formed which has a detrimental effect on the appearance of the die cast shapes by causing the formation of so called "fisheyes" or shapes having a kind of spotty appearance. The reason for such a non-homogenous melt is that the granular plastic which is fed into the casting machine cylinder remains in the region of the plastifying screw for only a short period, and is also due to the formation of a shearing zone in the front portion of the screw which is also referred to as a "metering zone."

In order to overcome the above disadvantages, it has been proposed to collect the liquid or molten plastic mass which accumulates during plastification under increased pressure between the die casting nozzle and the end of the screw adjacent the nozzle. The increased pressure is effected by pressurizing the piston which moves back with the screw in a direction toward the nozzle. This prior art method, however, has the disadvantage that the plastifying effect is significantly reduced. Dependent upon the screw geometry, this decrease can be 50% or more.

It has also been proposed, for the purposes of processing of plastics which can only be processed with difficulty, to employ worms and screws of a special nature and special configuration, for example, a screw having a special pitch and screw thread depth. However, such screws are very expensive and moreover they have a reduced effect when used with ordinary thermo-plastic substances, such as polyethylene or polystyrene and the usual resin casting materials, because the feed and plastification effect of such special screws is less if compared with ordinary screws for such substances.

In accordance with the above invention it has been found that the above-mentioned difficulties and drawbacks in the die casting of plastics which have a melting point in the neighborhood of the operating temperature, for example, acetal resins, can be overcome by using an ordinary screw having an exchangeable special end piece or head constructed in accordance with the invention. The invention is characterized by a removable head construction which is formed with a portion for connection to the end of a screw with an intermediate transition diameter comparable to the base diameter of the screw (between threads) and which includes a polygonal portion and a throttling portion proceeding in a direction toward the discharge nozzle. The head piece also includes the usual tip which is of streamlined configuration, such as a conical shape.

A screw having an end piece constructed in the manner indicated above has the advantage that it can handle plastics such as acetal resins, and, when it is desired, to handle resins of different characteristics, it is only necessary to detach the head piece and substitute a conventional head piece. The screw is of a configuration such that rapid and complete melting of the feed material (granular plastic) is accomplished due to a squeezing action in connection with the thermic influence and compared with the casting of the customary thermoplastics only an insignificant decrease in the plastifying effect takes place.

Accordingly, it is an object of this invention to provide an improved die-casting machine.

A further object of the invention is to provide a die-casting apparatus which includes a rotatable and axially displaceable screw having a removable end piece shaped to define a polygonal zone and throttle zone with the surrounding cylinder and terminating in a streamlined end portion adjacent the injection discharge opening.

A further object of the invention is to provide an extrusion device with a screw having a removable head of special configuration which is simple in design, rugged in construction and economical to manufacture.

The various features of novelty which characterize the invention are pointed out with particularity in the claims annexed to and forming a part of this specfication. For a better understanding of the invention, its operating advantages and specific objects attained by its use, reference should be had to the accompanying drawings and descriptive matter in which there are illustrated and described preferred embodiments of the invention.

In the drawings:

FIG. 1 is a partial longitudinal section of a die casting machine constructed in accordance with the invention;

FIG. 2 is a section taken on the line II—II of FIG. 1;

FIG. 3 is a section similar to FIG. 2 but of another embodiment of the invention;

FIG. 4 is a section similar to FIG. 2 of still another embodiment of the invention; and FIG. 5 is a detailed view of a portion of the device indicated in FIG. 1.

Referring to the drawings in particular, the invention embodied therein comprises a die casting machine which includes a cylinder 1 in which there is arranged a rotatable and axially displaceable screw 2. The screw 2 is provided with threads 10 which correspond in diameter substantially to the diameter of the interior wall 11 of the cylinder. The spaces or land portions between the threads have a wall or core diameter 13 such that a space 12 is provided between the periphery thereof and the interior wall 11 to define a gap 14 into which material is fed. The material is fed to the cylinder by means such as a hopper (not shown) which is connected to the cylinder. The exterior cylinder 1 includes a thickened wall portion or head 4 which has a nozzle 5 defined therein which may be positioned to align with an injection duct 50 provided in a stationary mold half 6, indicated diagrammatically on a small scale in comparison to the plastifying cylinder 1. Removable mold half 7 forms, together with the stationary mold half 6, a cavity 8 for forming of the cast material therein.

In accordance with the invention, the screw 2 is provided with a removable end piece or head 3 having an end part 15 with an external thread for threaded engagement into an internal threaded recess formed at the end of the screw 2. The end piece 3 and the screw 2 are provided with a complementary conical taper 16 so that the end piece 3 will be accurately centered when the threaded portion is tightened in the screw.

The end piece 3, in accordance with the invention, is provided with a cylindrical zone 20 having a diameter which corresponds substantially to the core diameter 13 of the screw 2. A transition zone 21 is formed at the nozzle end of the zone 20 which is curved to conform to the desired flow and leads to a polygonal zone 22 which, in the embodiment illustrated, is hexagonal. Between the individual hexagonal surfaces 23 there are formed circular arc sections 24. The arc sections 24 merge directly into a throttling zone 26 in a direction toward the nozzle. The end of the throttling zone connects directly to the tip portion or transition part 27 which is streamlined and, in the embodiment illustrated, is made of a conical configuration. The hexagonal surfaces 23 are also formed with a transition 28 shaped to provide advantageous flow conditions for the molten thermoplastic materials (see FIG. 5).

The outer diameter of the throttle zone 26 is slightly smaller than the interior diameter of the interior wall 11 of the cylinder. The circular arc sections 24 are made slightly smaller than the diameter of the interior wall 11 and thus define a flow gap 30 which is smaller than 10% of the screw passage depth 14. In a concrete embodiment, this would mean, for example, with a screw passage depth of 3.5 mm., a flow gap of 0.25 mm. would be provided.

When an end piece 3 of the type indicated in FIGS. 1 and 2 is employed, plastification by the screw die casting machine is as follows: The plastic granules will be processed or fed to the machine through a follower feed hopper (not shown). The granules are then taken along by the rotation of the screw and, due to the action of shearing forces between the plastic granules, and also due to the heating of the jacket of the cylinder and the surface of the screw, the granules are melted. The plastic mass which gradually liquifies is conveyed, by the screw, toward the nozzle 5 into the space between the end piece 3 and the cylinder head 4. The nozzle 5 is generally provided with a closure element which is not indicated and which is maintained closed until injection is desired, at which time it is opened.

Particularly with thermoplastic substances such as acetal resins which may be processed with difficulty only, the period during which the resin remains in the machine from the intake zone of the screw up to the end of the metering zone (not shown) is too short in order to enable complete melting of all the granules. Therefore, in prior screws at the end of the metering zone granules which did not melt were distributed throughout the melt. These granule particles negatively affected the final die cast body, particularly in respect to the appearance of its surface.

With the inventive end piece 3, the plastic melt which is intermingled with the individual encircled granule particles is taken up by the hollow spaces which are formed between the hexagonal surfaces 23 and the cylinder 1 and flow through the flow gap 30 between the cylinder and the circular arc segments 24. The melt flows under a squeezing action from the region of one of the hexagonal surfaces 23 into the next one. Due to this squeezing, a complete melting of the granule bodies is accomplished. The throttling zone 26, which is provided after the hexagonal zone 22 and which also defines a very small flow gap 30 with the cylinder 1, makes it possible to melt all remaining plastic granules which are not melted before the material flows around the tip portion 27. Thus, with the inventive construction all granules must be melted before they can flow to the nozzle head 4 for discharge through the nozzle head 5 into the cavity 8.

In order to reduce the throttle action of the throttling zone 26 to a minimum and thus to obtain a maximum plastification effect of the plastifier and injection screw 2, the length of the zone 26 is, at its narrow area, so short that it amounts to a maximum of twice the amount of the depth 14 between the wall 13 of the screw and the interior wall 11 of the cylinder. In the same manner the circular arc segment 24 has about the same width.

With the arrangement of the invention with the forced squeezing effect and a very insignificant throttling zone and the use of an ordinary screw, it is possible to process thermoplastics which, prior to the present invention, could be processed only with great difficulty. Acetal resins can now be worked with a plastifying effect of about 80% relative to the normal feed which is dependent on the geometry of the screw. The ordinarily employed thermoplastics, such as polystyrene, polyethylene, and cellulose acetate, can from experience be worked or processed with plastification effects of 100% or only slightly below. At the same time, due to the hexagonal construction of the polygon portions, an ordinary tool, for example, a key wrench, fork key or the like, may be used to screw the end piece 3 onto the screw 2 with little difficulty.

In some instances it is desirable to reduce the number of arc segments 24, for example, only three segments 24' are employed in the embodiment indicated in FIG. 3. In order to insure that the core diameter 13 is not undercut, the polygonal configuration between the arcuate portions 24 are made curved, as indicated at 31.

In other instances it is desirable to employ a very large number of arcuate portions 24", as indicated in the embodiment of FIG. 4. This may be important, for example, where the screw diameters are particularly large. The polygon having eight divisions, as indicated in FIG. 4, may be employed. The intermediate spaces between straight polygon surfaces and the mass cylinder will be too small, and for this reason the polygonal configuration is made with concave polygonal portions, as indicated at 33. The advantages of this construction are that the polygonal areas form increased areas for operating on the plastic granules.

It should be appreciated that the cylindrical zone 20 may have varying lengths, particularly if a predetermined mixing effect is to be obtained before the squeezing of the thermoplastic melt is to be accomplished. This cylindrical zone 20 serves, however, as essentially a well defined transition from the screw to the end piece.

While specific embodiments of the invention have been shown and described in detail to illustrate the application of the inventive principles, it will be understood that the invention may be embodied otherwise without departing from such principles.

What is claimed is:

1. A screw die casting machine which includes a rotatable and axially displaceable screw arranged in a cylinder which is adapted to be fed with granular and similar materials to be cast, comprising a screw having threads thereon, and an end piece connected to said screw, said end piece having a polygonal zone area defined around its periphery by a plurality of arcuate portions of substantially the same diameter as the interior of the associated cylinder and recessed polygonal portions connecting the arcuate portions, said screw further having a throttling area defined around its periphery of a diameter slightly smaller than the diameter of the interior of the cylinder with which it is to be associated connected to the polygonal area on the side opposite from the connection to said screw, and a streamlined tip area connected to the throttling area on the side opposite from the connection to said polygonal area.

2. A screw die casting machine according to claim 1, wherein said polygonal area includes at least three arcuate portions of a diameter slightly smaller than the diameter of the cylinder with which the screw is to be employed.

3. A screw die casting machine according to claim 1, wherein said polygonal area includes at least six arcuate portions formed on a diameter slightly smaller than the interior diameter of the cylinder with which it is to be used.

4. A screw die casting machine according to claim 1, wherein said polygonal area includes at least eight arcuate areas formed on a diameter slightly smaller than the interior diameter of the cylinder with which the screw is to be associated.

5. A screw die casting machine according to claim 1, wherein the diameter differential between the throttling zone and the interior diameter of the associated cylinder is smaller than 10% of the diameter difference between the core diameter of the screw and the internal diameter of the cylinder.

6. A screw die casting machine including a cylinder having a head portion forming a nozzle at one end, a screw rotatable in said cylinder, said screw having threads of an external diameter substantially equal to the internal diameter of said cylinder and having a reduced core diameter between said thread, a removable end piece connected to said screw between said screw and said nozzle, said end piece having a transition zone extending around its periphery of a diameter substantially equal to the core diameter of said screw located adjacent said screw, a polygonal area extending around its periphery defined on said end piece connected at one end to said transition area and extending toward said nozzle, said polygonal area including a plurality of arcuate portions of slightly lesser diameter than the internal diameter of said cylinder interconnected by chordal portions, said end piece further having a throttle zone extending around its periphery defined by an area of said end piece extending from said polygonal area toward said nozzle and being of slightly smaller diameter than the interior diameter of said cylinder, said end piece further including a streamlined tip portion extending from said throttle zone in a direction toward said nozzle.

7. A device according to claim 6, wherein said throttling zone is smaller than 10% of the diameter differential between the interior diameter of the cylinder and the core diameter of said screw.

8. A device according to claim 6, wherein the width of each of the arcuate portions of said end piece is smaller than the thread depth.

9. A device according to claim 6, wherein said polygonal areas chordal portions have rounded surfaces.

10. A device according to claim 9, wherein said chordal portions have convex rounded surfaces.

11. A device according to claim 9, wherein said chordal portions are concave.

12. A screw die casting machine including a screw, said screw being rotatable and axially displaceable arranged in a cylinder, said cylinder having a nozzle in a head portion adapted to be alignable with an inlet within a separable die, said screw having threads of an external diameter substantially equal to the internal diameter of said cylinder and having a reduced core diameter between said threads, said screw having a removable end piece within said cylinder head portion, said end piece having a polygonal area extending around its periphery adjacent said screw and having a throttle zone extending around its periphery adjacent said polygonal area extending toward said nozzle, said polygonal area including a plurality of arcuate portions interconnected by chordal portions, said throttle zone and said arcuate portions having the same and slightly smaller diameter than the internal diameter of said cylinder, the length of said throttle portion being equal or shorter twice the difference between the said internal diameter of said cylinder and the said reduced core diameter of the screw between said threads adjacent said end piece, said end piece having a streamlined tip area adjacent said throttle zone extending in direction towards said nozzle.

13. A screw die casting machine according to claim 12, wherein said polygonal area chordal portions of said end piece have equal depths as said adjacent screw threads.

14. A screw die casting machine according to claim 12, wherein said polygonal area chordal portions of said end piece have smaller depths than the difference between said inner diameter of said cylinder and said core diameter of said screw adjacent to said end piece.

References Cited by the Examiner
UNITED STATES PATENTS

| | | | |
|---|---|---|---|
| 2,810,159 | 10/1957 | Teichmann | 18—12 |
| 3,002,229 | 10/1961 | Friederich | 18—30 |
| 3,131,433 | 5/1964 | Volland | 18—30 |
| 3,209,408 | 10/1965 | Kelly | 18—30 |

J. SPENCER OVERHOLSER, *Primary Examiner.*

W. J. STEPHENSON, *Examiner.*

W. L. McBAY, *Assistant Examiner.*

UNITED STATES PATENT OFFICE
CERTIFICATE OF CORRECTION

Patent No. 3,314,111                                                                April 18, 1967

Walter Tanner et al.

It is certified that error appears in the above identified patent and that said Letters Patent are hereby corrected as shown below:

In the heading to the printed specification, lines 4 and 5, "Oberuzwil, Switzerland" should read -- Uzwil, Switzerland --.

This certificate supersedes Certificate of Correction issued March 4, 1969.

Signed and sealed this 24th day of March 1970.

(SEAL)
Attest:

Edward M. Fletcher, Jr.                              WILLIAM E. SCHUYLER, JR.
Attesting Officer                                           Commissioner of Patents